US012717545B2

(12) United States Patent
Kennedy et al.

(10) Patent No.: US 12,717,545 B2
(45) Date of Patent: Aug. 25, 2026

(54) TININESS DETECTION

(71) Applicant: Arm Limited, Cambridge (GB)

(72) Inventors: Michael Alexander Kennedy, Cambridge (GB); Marco Montagna, Cambridge (GB); Karel Hubertus Gerardus Walters, Cambridge (GB); Ian Michael Caulfield, Cambridge (GB)

(73) Assignee: Arm Limited, Cambridge (GB)

( * ) Notice: Subject to any disclaimer, the term of this patent is extended or adjusted under 35 U.S.C. 154(b) by 1090 days.

(21) Appl. No.: 17/855,856

(22) Filed: Jul. 1, 2022

(65) Prior Publication Data

US 2024/0004611 A1 Jan. 4, 2024

(51) Int. Cl.
*G06F 7/499* (2006.01)

(52) U.S. Cl.
CPC .. *G06F 7/49915* (2013.01); *G06F 2207/3836* (2013.01)

(58) Field of Classification Search
CPC ......... G06F 7/483; G06F 7/499–49915; G06F 7/49936–49947; G06F 7/49957
See application file for complete search history.

(56) References Cited

U.S. PATENT DOCUMENTS 5,892,698 A * 4/1999 Naffziger .............. G06F 7/5443 708/501
6,298,367 B1 * 10/2001 Oberman ............ G06F 9/30014 712/E9.02
6,381,624 B1 * 4/2002 Colon-Bonet ........ G06F 7/5443 708/523
12,164,881 B2 * 12/2024 Lutz ........................ G06F 7/483
2014/0181169 A1 * 6/2014 Ferguson ............ G06F 9/30014 708/497
2018/0315399 A1 * 11/2018 Kaul .................... G06N 3/0495
2023/0214179 A1 * 7/2023 Lies .................... G06F 7/49947 708/497

* cited by examiner

*Primary Examiner* — Matthew D Sandifer
(74) *Attorney, Agent, or Firm* — NIXON & VANDERHYE P.C.

(57) ABSTRACT

Processing circuitry performs a processing operation to generate a two's complement result value representing a positive or negative number in two's complement representation. Normalization-and-rounding circuitry converts the two's complement result value to a normalized-and-rounded floating-point result value represented using sign-magnitude representation. The normalization-and-rounding circuitry comprises incrementing circuitry to perform an increment addition (e.g. a rounding increment or a conversion increment) to generate a fraction of the normalized-and-rounded floating-point result value. For an operation where the increment addition is required to be performed, tininess detection circuitry detects the after-rounding tininess status based on a still-to-be-incremented version of the normalized-and-rounded floating-point result value prior to the increment addition by the increment circuitry.

15 Claims, 6 Drawing Sheets

TININESS DETECTION

BACKGROUND

Technical Field

The present technique relates to the field of data processing.

Technical Background

A data processing apparatus may provide support for processing numbers represented in floating-point representation. In a floating-point representation, a number is represented using a significand 1.F or 0.F, an exponent E and a sign bit S. The sign bit S represents whether the floating-point number is positive or negative. The significand 1.F or 0.F represents the significant digits of the floating-point number (with an implicit bit of 1 or 0 for normal and subnormal values respectively, and F denoting the stored bits of the floating-point number which indicate remaining bits of the significand after the implicit bit of 1 or 0). For normal numbers, the exponent E represents the position of a radix point (also known as a binary point) relative to the significand. Hence, by varying the value of the exponent, the radix point can float left and right within the significand, so that for a predetermined number of bits, a floating-point representation can represent a wider range of numbers than a fixed-point representation for which the radix point has a fixed location within the significand.

SUMMARY

At least some examples of the present technique provide an apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry.

At least some examples provide a non-transitory computer-readable medium to store computer-readable code for fabrication of an apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry.

At least some examples provide an apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for any given instance of the processing operation performed by the processing circuitry, the incrementing circuitry is configured to perform only one of the result rounding increment and the conversion increment.

Further aspects, features and advantages of the present technique will be apparent from the following description of examples, which is to be read in conjunction with the accompanying drawings.

DESCRIPTION OF EXAMPLES

Figure 1:
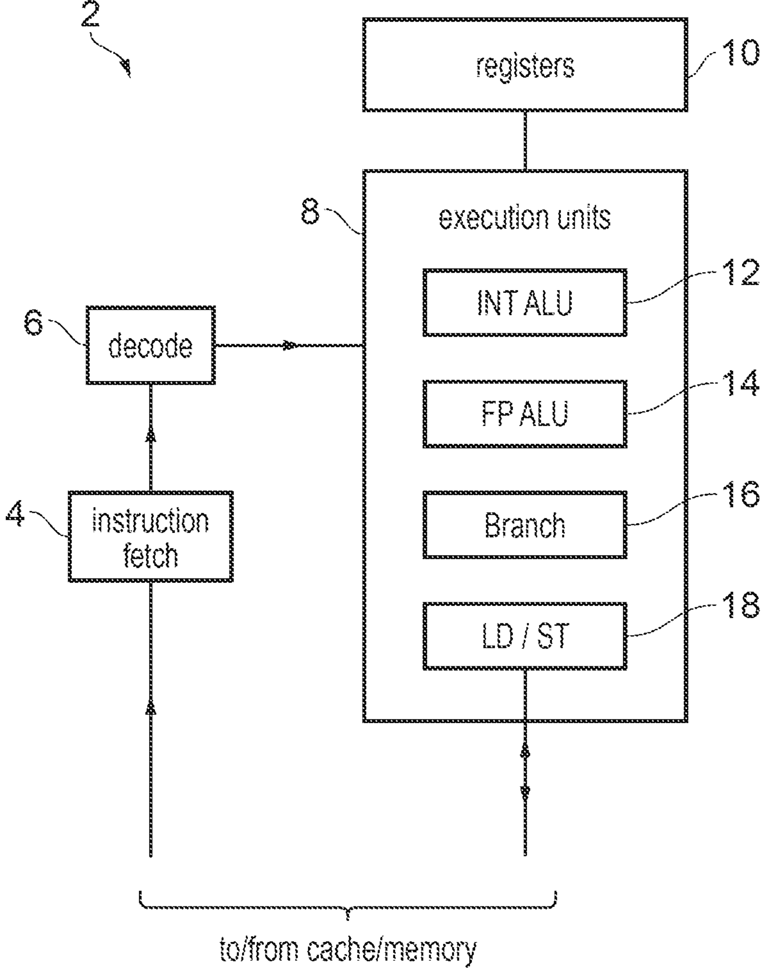
FIG. 1 schematically illustrates an example of a data processing apparatus.

The IEEE-754 floating-point standards define the concept of tininess for an outcome of a floating-point operation. An outcome of a floating-point operation is considered "tiny" if the outcome corresponds to a non-zero number having a magnitude smaller than a minimum non-zero magnitude representable as a normal floating-point number in the floating-point format to be used for the result value. Detection of tininess status can be useful for determining whether to signal an underflow exception for a floating-point operation, which may indicate to software or to a programmer that the true result of the floating-point operation had a magnitude too small to be exactly represented in the floating-point format being used.

The IEEE-754 standards define a condition that has to be satisfied in order for a result to be considered tiny, but offer no practical suggestion about how to implement tininess detection circuitry for detecting whether the outcome is tiny. Hence, processor micro-architects have circuit design decisions to make about how to implement the hardware circuit logic of the tininess detection circuitry. The design of the tininess detection circuitry involves design decisions that are not implicit from the definition of tininess provided by the standards.

The standards define two alternative ways for detecting tininess. For example, the IEEE-754 1985 standard defines (where Emin refers to the minimum exponent representable for normal floating-point numbers in the floating-point format being used):

"Tininess may be detected either:

1. After rounding—when a nonzero result computed as though the exponent range were unbounded would lie strictly between $\pm 2^{Emin}$
2. Before rounding—when a nonzero result computed as though both the exponent range and the precision were unbounded would lie strictly between $\pm 2^{Emin}$."

Detection of after-rounding tininess status may be more complex than before-rounding tininess status because of the need to consider rounding of the result. Rounding may be based on the selective addition of a result rounding increment, where whether the rounding increment is added depends on analysis of certain bits of the unrounded result. For some operations, the floating-processing operation may generate a result in two's complement representation which then needs to be converted back to sign-magnitude representation to generate a floating-point result value. Two's complement conversion may be performed by inverting all bits of the value and adding a conversion increment at the least significant bit. The two's complement conversion may further complicate detection of after-rounding tininess status.

One approach could be to wait for the result rounding increment and/or conversion increment to be added, before calculating the after-rounding tininess status based on the incremented result. This may make tininess status detection simpler, but the increment may be a relatively slow operation and so this makes the overall processing time longer for performing the processing operation including normalization and tininess detection. This can make it harder to meet circuit timing requirements, which might mean that the pipeline has to be lengthened or the clock frequency has to be reduced to accommodate the slower operation.

In the technique discussed below, after-rounding tininess status is detected based on a still-to-be-incremented version of the normalized-and-rounded floating-point result value prior to the increment addition by the increment circuitry for adding the result rounding increment or the conversion increment. Hence, there is no need to wait for the increment before calculating the after-rounding tininess status. Therefore, the overall processing time is reduced and it becomes more feasible to meet potentially constrained timing requirements, helping to support lower clock frequency. Therefore, processing performance can be improved with this technique.

Hence, an apparatus comprises processing circuitry to perform a processing operation to generate a two's complement result value representing a positive or negative number in two's complement representation, normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value. The normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation. For an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry.

The tininess detection circuitry may detect the after-rounding tininess status based on a still-to-be-incremented version of the normalized-and-rounded floating-point result value, even when the two's complement result value represents a negative number in the two's complement representation (and so a conversion increment may be added by the increment circuitry).

For an operation where the two's complement result value represents a negative number, the tininess detection circuitry may detect the after-rounding tininess status based on a one's complement value obtained based on inverting bits of the two's complement result value. By using the one's complement of the two's complement result as the basis for tininess detection, there is no need to carry out the conversion increment before detecting the after-rounding tininess status, so processing is faster. Analysis of bits of the one's complement value can be sufficient, as the implicit effect of a conversion increment (if needed) can be considered by the tininess detection circuitry when determining the after-rounding tininess status.

The tininess detection circuitry can detect the after-rounding tininess status based on the still-to-be incremented version, without a further increment other than the result rounding increment or the conversion increment being performed on the still-to-be incremented version. For example, the after-rounding tininess detection can be based on analysis of one or more bits of the still-to-be incremented version and/or a value dependent on an exponent value associated with the two's complement result value, so that it is not necessary to actually add an increment to be able to detect whether the incremented value would be tiny.

In some examples, a portion of the normalization-and-rounding circuitry is shared circuitry also used by the tininess detection circuitry to detect the after-rounding tininess status. Hence, the overall circuit area for the apparatus can be reduced by sharing some circuitry between the normalization-and-rounding circuitry and the tininess detection circuitry.

For example, the shared circuitry may comprise shift circuitry to perform a normalization shift, and the still-to-be-incremented version used by the tininess detection circuitry for detecting the after-rounding tininess status may be dependent on a shifted result output by the shift circuitry. By reusing the output of the shift circuitry provided for normalization, the tininess detection circuitry can be implemented more efficiently than if the tininess detection circuitry and normalization-and-rounding circuitry had separate shifters.

The normalization-and-rounding circuitry (and in some examples the tininess detection circuitry as mentioned above when the shift circuitry is shared) may comprise shift circuitry to perform a first-stage normalization shift to shift the two's complement result value by a number of bit positions determined based on an exponent corresponding to the two's complement result value and a leading digit indication indicative of a number of leading digits having a predetermined value in the two's complement result value, and select whether to perform an operation equivalent to a second-stage normalization shift to left shift a result of the first-stage normalization shift by a further bit position, depending on whether a most significant bit of a result of the first-stage normalization shift is 0 or 1. The exponent corresponding to the two's complement result could be calculated based on unbiased exponents of one or more operands for the processing operation. For example, if the processing operation is a multiply-accumulate operation to obtain a result A*B+C, and the addition is based on aligning the addend operand C with the product A*B before adding to form the two's complement result, then the exponent corresponding to the two's complement result could be calculated as the sum of the unbiased exponents of operands A and B.

The leading digit indication need not be a precise indication—it could be an approximate estimate which might be incorrect by one bit position, so that the second-stage normalization shift may be performed in cases where it turns out the estimate is determined (based on the non-redundant form of the two's complement result value) to be incorrect. Nevertheless, performing the first-stage normalization shift and then the second-stage normalization shift can be faster than obtaining a precise indication of the number of bits by which the shift needs to be performed before carrying out any shift at all.

For example, a leading digit anticipator may be provided to estimate the location of the leading non-zero bit in the two's complement result value based on sum and carry terms generated by a carry-save adder of the processing circuitry—the sum and carry terms represents the two's complement result in a redundant form. The processing circuitry may have a carry-propagate adder which adds the sum and carry terms to product the two's complement result value in a non-redundant form. The leading digit anticipator can, based on the redundant form of the two's complement result, provide the estimate of the location of the leading bit in the two's complement result value earlier than would be possible based on the non-redundant form of the two's complement result itself, which allows the control signals for the shift circuitry to be generated earlier, speeding up the normalization-and-rounding (and tininess detection when the tininess detection circuitry also shares the shift circuitry).

The second-stage normalization shift can, in some examples, be performed simply by selecting a different subset of bits from the output of the first-stage normalization shift than would be selected when the second-stage normalization shift is not required. For example, a single shifter may be provided to implement both first-stage and second-stage normalization shifts, with a multiplexer selecting a first subset of bits output by the shifter in the case when the second-stage normalization shift is not required, and selecting a second subset of bits output by the shifter in the case when the second-stage normalization shift is required. The second subset of bits may be one bit position to the right of the first subset of bits.

The tininess detection circuitry may, in some examples, generate a first candidate value based on a first shifted value corresponding to a shifted result for which the second-stage normalization shift is not required; generate a second candidate value based on a second shifted value corresponding to a shifted result taking into account the second-stage normalization shift; and select between the first candidate value and the second candidate value in response to information indicative of whether the second-stage normalization shift is required, wherein the after-rounding tininess status depends on which of the first candidate value and the second candidate value is selected. The "candidate values" calculated for the first/second shifted values could for example include rounding status values used to determine whether a rounding increment should be considered for the after-rounding tininess detection, and/or upper bits of the shifted result which influence assessment of whether the after-rounding tininess status can be detected using a primary detection scheme or detection secondary scheme as discussed further in the following paragraph. Hence, the candidate values could be intermediate values used to detect the after-rounding tininess status. Alternatively, the candidate values could indicate the final tininess detection result for the after-rounding tininess status. By speculatively calculating the candidate values for both the case when the second-stage normalization shift is required and the case when the second-stage normalization shift is not required, and then selecting between the candidate values once it is known whether the second-stage normalization shift is required, the candidate values can be calculated faster than if one first waited for the indication of whether the second-stage normalization shift is required before proceeding to calculate the candidate values. Therefore, performance can be improved.

The tininess detection circuitry may comprise primary tininess detection circuitry and secondary tininess detection circuitry. The primary tininess detection circuitry detects, based on an adjusted exponent adjusted to account for a normalization shift performed by the normalization-and-rounding circuitry, whether an outcome of the processing operation is in a predetermined range for which the increment addition by the incrementing circuitry is capable of changing whether the outcome is tiny. The secondary tininess detection circuitry determines, in a case when the primary tininess detection circuitry detects that the outcome is in the predetermined range, whether the outcome is tiny based on analysis of bits of the still-to-be-incremented version of the normalized-and-rounded floating-point result value. This recognises that for the majority of possible outcomes of the processing operation, the exponent will be too large for there to be any chance of the outcome being tiny, or too small for there to be any chance of the outcome not being tiny, regardless of bit values of the fraction for the two's complement result value. For exponents closer to the exponent associated with the minimum non-zero magnitude representable as a normal floating-point number, one or more most significant bits of the still-to-be incremented version may also be considered by the primary tininess detection circuitry, but the majority of less significant bits still do not need to be considered. More careful analysis of a greater number of bits of the still-to-be-incremented version can be restricted to cases where the outcome is in the predetermined range for which the secondary tininess detection circuitry is applied. Hence, the secondary tininess detection circuitry can examine more bits of the still-to-be-incremented version than are considered by the primary tininess detection circuitry. This approach means that the circuit hardware design can be simplified because more careful analysis of the still-to-be-incremented version can be restricted to those cases where tininess status could change as a result of the increment addition. Outside that range it can be much simpler to set the tininess status without careful analysis of particular bit values of less significant bits of the still-to-be-incremented version. Hence, identifying whether the outcome is in a predetermined range using the primary tininess detection circuitry reduces the number of possibilities that require consideration by the secondary tininess detection circuitry, and hence simplifies the circuit hardware design for both the secondary tininess detection circuitry itself and the tininess detection circuitry as a whole.

For example, the primary tininess detection circuitry may detect whether the outcome is in the predetermined range based on the exponent associated with the result of the first-stage normalization shift mentioned above, and the most significant two bits of the fraction. The outcome may be considered to be in the predetermined range when either the biased exponent is 1 and the top two bits of the fraction (in 1's complement form following any inversion for 2's complement conversion) are 0b01 or the biased exponent is 0 and the top bit of the fraction (in 1's complement form) is 1. Otherwise, the outcome may be considered to be outside the predetermined range.

When the primary tininess detection circuitry detects that the outcome is outside the predetermined range, the tininess detection circuitry may detect the after-rounding tininess status independent of an output of the secondary tininess detection circuitry. Hence, the output of the secondary tininess detection circuitry can be ignored when the outcome is determined by the primary tininess detection circuitry to be outside the predetermined range. For example, a multiplexer may select between a primary after-rounding tininess status determined by the primary tininess detection circuitry and a secondary after-rounding tininess status determined by the secondary tininess detection circuitry, with the control input for the multiplexer being an indication of whether the primary tininess detection circuitry determined that the outcome is within or outside the predetermined range. The secondary after-rounding tininess status may be unreliable in cases when the primary tininess detection circuitry determines that the outcome is outside the predetermined range, since the operations performed by the secondary tininess detection circuitry may be tailored to cases when the result is in the predetermined range, but this does not matter because in the case when the outcome is outside the predetermined range, the primary after-rounding tininess status is selected by the multiplexer.

For rounding the fraction of the normalized-and-rounded floating-point result value, the normalization-and-rounding circuitry may determine the result rounding increment according to a given rounding mode, and when the result rounding increment is required, apply the result rounding increment at a given bit position corresponding to a least significant bit position to be retained after rounding the normalized-and-rounded floating-point result value. On the other hand, the secondary tininess detection circuitry may determine whether rounding of the fraction of the floating-point result value at another bit position to the right of the given bit position would cause a change in whether the outcome is tiny. For example, this other bit position to the right may be one place to the right of the given bit position. This reflects that the definition of after-rounding tininess status in the IEEE-754 standards mentioned above assumes an unbounded exponent range, which means that the rounding would be applied at the least significant bit of a value of the form $1.F*2^E$ even if E would be required to be smaller than the minimum supported exponent in the floating-point format being used. Hence, rounding may be assumed to be at a lower bit position for the purpose of after-rounding tininess status determination than is performed for the rounding of the normalized-and-rounded floating-point result value itself.

While this may on the face of it require a potentially large additional shift to handle rounding of a wide range of possible subnormal values at various bit positions less significant than the bit position at which the result is rounded, in practice support for such large additional shifts is not needed. As the secondary tininess detection circuitry's consideration of rounding is limited to values in a relatively narrow range where the outcome of the processing operation is close to the boundary between the minimum normal number and the maximum sub-normal number representable in the floating-point format, there is no need for a large shift for the purpose of after-rounding tininess detection. For values in that range, a one-bit left shift would be enough, so the rounding can consider rounding at one bit position to the right of the given bit position used for the rounding of the normalized-and-rounded floating-point result value.

Hence, the secondary tininess detection circuitry may determine whether the rounding at the other bit position would cause the change in whether the outcome is tiny, based on a different selection of rounding status bits to a selection of rounding status bits used by the normalization-and-rounding circuitry for determining whether the result rounding increment is required for rounding the fraction of the floating-point result value. For example, a least significant bit, guard bit and sticky value used as rounding status flags to calculate a tininess-detection rounding increment according to a selected rounding mode may be selected (for the purpose of rounding for after-rounding tininess detection) based on bits of the still-to-be-incremented version of the normalized-and-rounded floating-point result value that are one place to the right of the corresponding bits used when selecting the rounding status flags for determining the result rounding increment applied for the actual result rounding to generate the normalized-and-rounded floating-point result value.

While such rounding status flags are used to determine a tininess detection rounding increment for the purpose of after-rounding tininess detection, it is not necessary to actually add this tininess detection rounding increment to be able to detect whether an outcome in the predetermined range subject to analysis by the secondary tininess detection circuitry is tiny. Instead, the secondary tininess detection circuitry can determine whether the rounding at the other bit position would cause the change in whether the outcome is tiny based on analysis of bits of the still-to-be-incremented version of the normalized-and-rounded floating-point result value, to avoid actually adding a further tininess detection rounding increment at the other bit position (that further rounding increment would otherwise have to be a separate increment addition to the increment addition being done for the rounding or two's complement conversion of the final normalized-and-rounded floating-point result value, so would cause additional delay—it is therefore useful to eliminate any such further rounding increment).

For example, the secondary tininess detection circuitry may perform an AND reduction of bits of the still-to-be-incremented version of the normalized-and-rounded floating-point result value to determine whether an addition of a tininess-detection rounding increment at the other bit position or an addition of the conversion increment at a least significant bit position would cause a change in whether the outcome is tiny due to propagation of a chain of carries caused by the tininess-detection rounding increment. Hence, the actual addition of the tininess-detection rounding increment or conversion increment is not required, because the AND reduction may evaluate whether if it was added this would cause carries to propagate to cause the result to no longer be tiny. If the AND reduction is zero, then addition of any tininess-detection rounding increment or conversion increment would not cause a change in tininess status. Hence, the secondary tininess detection circuitry may determine that the result is not tiny when the outcome is in the predetermined range, the tininess detection rounding increment or conversion increment is 1, and the AND reduction is 1. For outcomes in the predetermined range, the outcome may be considered to be tiny if either there is no tininess detection rounding increment or conversion increment, or the AND reduction is 0.

In some cases, for any given instance of the processing operation performed by the processing circuitry, the incrementing circuitry may perform only one of the result rounding increment and the conversion increment. This recognises that if the conversion increment (for negating the result to account for conversion from a negative two's complement number to a sign-magnitude number) would cause a ripple to the position where the rounding increment is added, then this would mean that all bits below the rounding position were 1, so that following the conversion increment they all become 0. This means that the result of applying the conversion increment would be a value that can be exactly represented in the floating-point format being used (there are no less significant "1" bits to be discarded), and so rounding is no longer required. Hence, a rounding increment is only required if either there is no conversion increment to apply, or applying the conversion increment would not cause any change to the bit at the rounding position because at least one lower bit was 0 causing the propagation of carries due to the conversion increment to terminate before reaching the rounding position. This means it is sufficient to apply only one of the rounding increment and the conversion increment, not both. A trailing digit count could be used to determine whether the conversion increment may cause a ripple of carries to the rounding position. The trailing digit count may be applied to a pre-inverted value before an inversion is applied for the negation of the negative value, and so the trailing digit counter may count trailing 0 bits (which would become 1 after inversion). If the conversion increment is required and the trailing digit count finds enough bits of 0 beyond the rounding position, then no rounding increment needs to be added.

The technique described above can be used for any processing operation performed on floating-point values which can potentially generate a negative result represented as two's complement number, which is then to be converted back to normalized-and-rounded floating-point value in sign-magnitude form.

However, this technique can be particularly useful where the processing operation comprises a multiply-add operation to multiply a first operand by a second operand and add a product of the first operand and the second operand to a third operand. For a multiply-add operation, to speed up processing it may be desirable to align the third operand with the result of the multiply by applying a shift before the result of the multiply is known. Therefore, unlike alignment performed for standalone additions/subtractions (which would normally be applied to the one of the operands being added/subtracted that has the smallest magnitude to ensure the result can be considered already in sign/magnitude form to avoid the need for a subsequent two's complement conversion), it is possible that the result of the multiply-add operation may be a negative value represented as a two's complement number, hence requiring a subsequent two's complement conversion back to sign-magnitude form. This therefore increases the complexity of after-rounding tininess detection because it considers the effects of both a possible conversion increment and a rounding increment. By using the techniques discussed here, after-rounding tininess detection can be performing faster by not needing to wait for the addition of the conversion increment or rounding increment before starting the tininess detection. As multiply-add operations are a very common operation in many processing workloads, this can be helpful for processing performance in a processor.

While many of the examples herein describe calculation of after-rounding tininess status, it will be appreciated that the apparatus may also support an option of determining before-rounding tininess status, which may be based on whether the unrounded result of the processing operation is smaller than the minimum normal number representable in the floating-point format being used. Some apparatuses may allow selection of whether tininess status is detected according to after-rounding or before-rounding tininess, based on a parameter configurable in software.

Other implementations may only support the after-rounding tininess detection and may not support before-rounding tininess detection.

Introduction to Floating-Point Representation

Floating-point (FP) is a useful way of approximating real numbers using a small number of bits. The IEEE 754-2008 FP standard proposes multiple different formats for FP numbers, but some commonly used formats are binary 64

(also known as double precision, or DP), binary 32 (also known as single precision, or SP), and binary 16 (also known as half precision, or HP). The numbers 64, 32, and 16 refer to the number of bits required in the stored value for each format.

Representation

FP numbers are quite similar to the "scientific notation" taught in science classes, where instead of negative two million we'd write $-2.0\times10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

TABLE 1

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$$-1^{sign}\times1.\text{fraction}\times2^{e}$$

where e is the true exponent computed from the biased exponent. The term 1.fraction is called the significand, and the 1 is not stored as part of the FP number, but is instead inferred from the exponent. All exponents except zero and the maximum exponent indicate a significand of the form 1.fraction. The exponent zero indicates a significand of the form 0.fraction, and a true exponent that is equal to 1-bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

TABLE 2

| sign | 5-bit exponent | 10-bit fraction | 11-bit significand | value |
|---|---|---|---|---|
| 0 | 01111 | 00_0000_0000 | 100_0000_0000 | $1.0\times2^{0}$ |
| 1 | 01110 | 10_0000_0000 | 110_0000_0000 | $-1.1\times2^{-1}$ |
| 0 | 00001 | 10_0000_0000 | 110_0000_0000 | $1.1\times2^{-14}$ |
| 0 | 00000 | 10_0000_0000 | 010_0000_0000 | $0.1\times2^{-14}$ |
| 1 | 11111 | 00_0000_0000 | | −infinity |
| 0 | 11111 | 00_1111_0011 | | NaN |

A large part of the complexity of FP implementation is due to subnormals, therefore they are often handled by microcode or software. Some processor implementations handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n$+i, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

TABLE 3

| | mode | definition |
|---|---|---|
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value

G—(guard) the next most significant bit (i.e. the first bit not included in the truncation)—the guaRd bit is also denoted as "R" in the examples discussed below.

S—(sticky) the logical OR of all remaining bits that are not part of the truncation Given these three values and the truncated value, we can always compute the correctly rounded value according to the following table:

TABLE 4

| mode | change to the truncated value |
|---|---|
| RNE | increment if (L&G)\|(G&S) |
| RNA | increment if G |
| RZ | none |
| RP | increment if positive & (G\|S) |
| RM | increment if negative & (G\|S) |
| RX | set L if G\|S |

For example, consider multiplying two 4-bit significands, and then rounding to a 4-bit significand.

sig1=1011 (decimal 11)

sig2=0111 (decimal 7)

multiplying yields sig1×sig2=1001_101 (decimal 77)

L Gss

The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Apparatus Example

FIG. 1 schematically illustrates an example of a data processing apparatus 2, for example a processor such as a CPU (central processing unit). The apparatus 2 has instruction fetch circuitry 4 for fetching program instructions from a cache or memory, and decode circuitry 6 to decode the fetched instructions to generate control signals for controlling execution units 8 to perform processing operations represented by the instructions. The execution units 8 perform the processing operations on operands read from registers 10 and write results of the operations to the registers 10. The execution units 8 may include a number of different types of execution unit for executing different classes of instruction, such as an integer arithmetic/logic unit (ALU) 12 for performing arithmetic and logical operations on integer values, a floating-point ALU 14 for performing floating-point operations on numbers represented in a floating-point representation, a branch execution unit 16 for executing branch instructions which can trigger a non-sequential change of program flow, and a load/store unit 18 for processing load operations which load data from the cache or memory to the registers 10 or store operations which store data from the registers 10 to the cache or memory. It will be appreciated that this is just an example of some types of execution unit which could be provided, but other examples may have other types.

Figure 2:
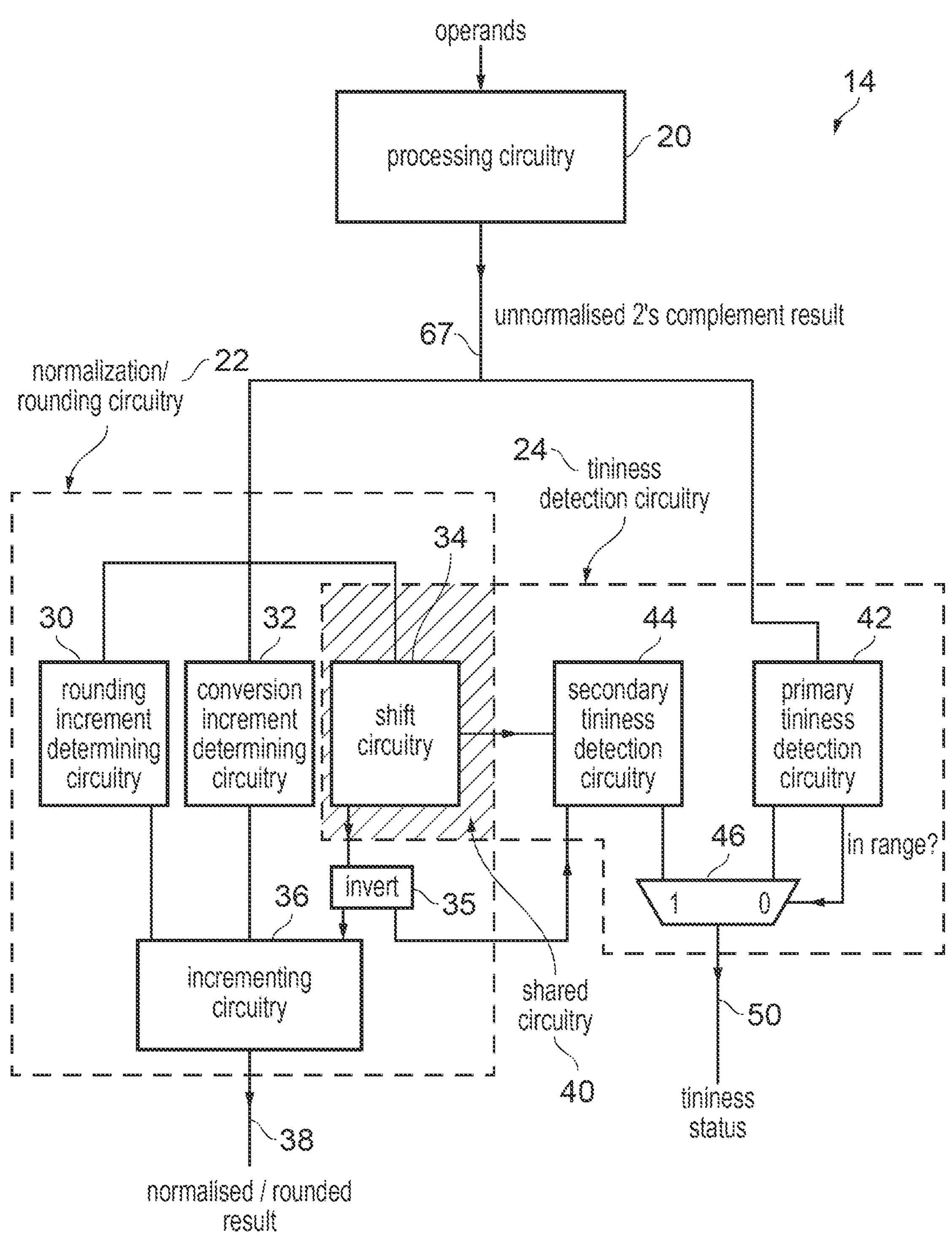
FIG. 2 illustrates processing circuitry, normalization/rounding circuitry and tininess detection circuitry.

FIG. 2 illustrates a portion of the floating-point ALU 14. The floating-point ALU 14 has processing circuitry 20 for carrying out a floating-point processing operation, such as a multiply-add operation. It will be appreciated that the floating-point ALU 14 can also support other operations performed on floating-point values, e.g. arithmetic operations such as addition, subtraction, multiplication, divide or square root operations, and conversion operations for converting between different floating-point representations or converting between a floating-point representation and a non-floating-point representation (e.g. integer or fixed-point). The floating-point ALU also includes normalization/rounding circuitry 22 for normalizing and rounding the result of the processing operation performed by the processing circuitry 20, and tininess detection circuitry 24 for detecting a tininess status for an outcome of a floating-point operation performed by the floating-point processing circuitry 20. The tininess status indicates whether an outcome of the floating-point operation is tiny. An outcome is considered tiny if it corresponds to a non-zero number with a magnitude that is smaller than a minimum non-zero magnitude representable as a normal floating-point number in a floating-point format to be used for the floating-point result value generated in the floating-point operation being performed by the floating-point processing circuitry 20. In the example below, tininess status is determined according to after-rounding tininess status, although some examples could support before-rounding tininess status determination as an additional option.

The result generated by the processing circuitry 20 is an unnormalised result value represented in two's complement form, so it could be either positive or negative. The normalization/rounding circuitry 22 includes rounding increment determining circuitry 30, conversion increment determining circuitry 32, shift circuitry 34, inverting circuitry 35 and incrementing circuitry 36. The shift circuitry 34 shifts the result of the processing operation to apply a normalization shift, to either (in the case of a normal result) cause the most significant non-sign bit to be placed at the most significant bit (it can be dropped from the final result as it is implicit in the floating-point format as discussed above), or (in the case of a subnormal result) limit the shift to avoid shifting beyond the minimum normal exponent. The rounding increment determining circuitry 30 may determine a rounding increment for rounding of the result, based on the rounding mode to be used and the L G S flags as discussed above in the discussion of floating-point representation. The conversion increment determining circuitry 32 determines whether the result of the processing operation is negative and hence a conversion from the negative value in two's complement form to a positive value in sign-magnitude form is required (if so, the sign bit of the final normalised/rounded floating-point result 38 is set to indicate a negative result). If a conversion is required, then the conversion increment determining circuitry 32 indicates that a conversion increment is to be applied by incrementing circuitry 36 and that the inverting circuitry should invert the output of the shift circuitry 34 so that the invert circuitry 35 generates a l's complement of the shifted value output by shift circuitry 34. Only one of the rounding increment generated by circuitry 30 and conversion increment generated by circuitry 32 is required at a time, because in cases where, in theory, both a rounding increment and a conversion increment could sometimes be required, for the conversion increment to affect the final result this would imply all bits below the rounding position are 1 so that the conversion increment causes them to change to 0 and a carry into the bit at the rounding position, resulting in an exact result that does not require rounding. In the cases when both the rounding increment and the conversion increment would be needed, the addition of the conversion incremented would not change the truncated rounded result as it would only affect bits less significand than the least significant bit of the truncated value. Therefore, the incrementing circuitry 36 applies either the rounding increment or the conversion increment to generate the final result 38.

The tininess detection circuitry 24 comprises the shift circuitry 34 (which is shared circuitry used for both the normalization and the tininess detection, so can be considered part of both the normalization/rounding circuitry 22 and the tininess detection circuitry 24), primary tininess detection circuitry 42, secondary tininess detection circuitry 44, and a multiplexer 46 for selecting between primary/secondary after-rounding tininess status values generated by the primary/secondary tininess detection circuitry 42, 44 respectively, to output the final after-rounding tininess status 50 associated with the normalized/rounded result 38. The multiplexer 46 selects the output of the secondary tininess detection circuitry 44 when the primary tininess detection circuitry 42 detects that the outcome of the processing operation is within a predetermined range in which addition of a rounding increment or conversion increment could change the tininess status, and otherwise selects the output of the primary tininess detection circuitry 42. The tininess status 50 determined by the tininess detection circuitry 24 can be used to determine whether an underflow has occurred, e.g. the underflow may occur if both the tininess status indicates a tiny result and the normalized/rounding circuitry 22 determined that the result is inexact because at least one non-zero bit (at a position less significant than the least significant bit that contributes to the result) has been discarded following rounding.

Figure 3:
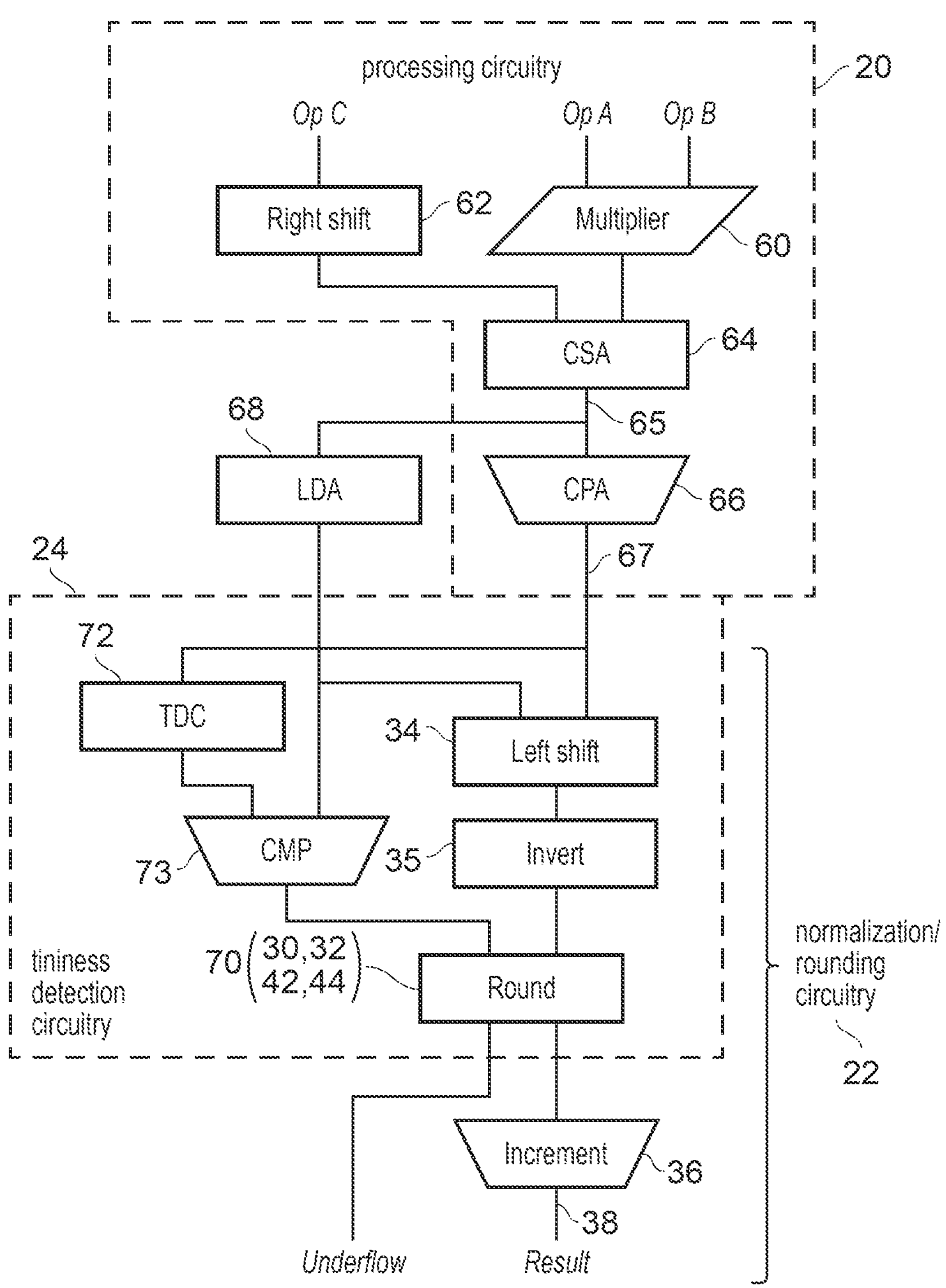
FIG. 3 illustrates a more detailed example showing a processing pipeline for implementing the processing circuitry, normalization/rounding circuitry and tininess detection circuitry.

FIG. 3 shows a processing pipeline for implementing the processing operation, normalization/rounding and tininess detection in more detail.

The processing circuitry 20 performs a multiply-add operation A*B+C on three floating-point operands A, B, C. If the sign of operand C is different to the sign of the product of the operands A, B, then the significand of operand C is negated prior to input to the processing circuitry 20 so that it is in two's complement form. A Booth multiplier 60 generates partial products for the multiplication of A and B based on the significands of floating-point operands A and B (any known multiplier design can be used for this). The pipeline has the multiplier aligned at the bottom of the initial sum. The addend significand C is aligned above the product. The addend is right shifted by shifter 62 to align with the product based on their exponents (the shift can be based on the difference between the sum of the exponents of the operands A and B being multiplied and the exponent of operand C). There are guard bits between the initial addend and multiplier alignment to require the addend to be right shifted only when there is an overlap—if there is no overlap so that all bits of addend are of greater significance than all bits of the product, the addend remains aligned at the higher bits than those used for the product result. The sum of the aligned addend and the partial products is calculated by carry-save adder 64 to produce a multiply-add result 65 in a redundant form comprising a carry term and a save term, and a carry-propagate adder 66 which adds the carry and save terms to produce a non-redundant result 67 which represents the unnormalised 2's complement result shown in FIG. 2. Hence, if the addend was of higher significance than all bits of the product, taking the more significant bits will result in the result 67 being equivalent in magnitude to the addend operand. As the third operand C was right shifted for alignment with the product A and B without checking which of the product A*B and operand C had the smaller magnitude, the result 67 could be negative. Although this causes some complexity for subsequent normalization/rounding and tininess detection operations, it is beneficial because it would not be practical to work out which of C and A*B has the smaller magnitude until after the additions 64, 66 have been performed, so shifting the third operand C regardless of which of C and A*B has the smaller magnitude allows the alignment shift 62 to be performed in parallel with the partial product formation 60 so that the addition of the third operand C can be included in the carry-save adder network 64 used to add the partial products for the multiplication. Although not shown in FIG. 3, the processing circuitry 20 also generates a result exponent for the unnormalised two's complement result 67, based on the sum of the exponents associated with operands A and B (C does not need to be considered since the addend operand C was already aligned with the product).

A leading digit anticipator (LDA) 68 generates an estimate of the position of the leading non-sign bit in the unnormalised two's complement result 67 produced by carry propagate adder 66, but to speed up generation of the estimate by not waiting for the slower carry propagate addition, the estimate is detected based on the carry/save terms produced by carry save adder 64. Any known leading digit anticipator design may be used. However, the estimate provided by the leading digit anticipator may be out by 1 bit position because the actual highest non-sign bit in the non-redundant result 67 may depend on the positions of carries caused by the addition of the carry or save terms by the carry propagate adder 66.

The shift circuitry 34 shifts the unnormalised two's complement result 67 in two steps. The first is a large left shift controlled based on the estimate of the leading bit position produced by the LDA 68. The second is an optional single bit left shift which is performed if the most significant bit resulting from the first stage shift is zero (indicating that there was no carry out of the leading 1 bit position in the carry/save terms due to the carry propagate addition 66). By performing the shift in two stages, the control signalling for setting up the first-stage left shift can be established based on the LDA 68 in parallel with the carry propagate addition, leaving only a single bit shift once the final CPA result 67 is available. If the second-stage single bit shift is required, this does not actually require a left shift to be performed, as instead the second-stage shift can be implemented by a multiplexer which selects whether the shifted result is taken from a first set of bit positions of the shifter output or a second set of bit positions of the shifter output one place to the right of the first set of bit positions. Hence, only a single stage shifter actually needs to be implemented in circuit logic, with the second stage shift being implicitly implemented in equivalent form by a multiplexer which performs an operation equivalent to the second stage shift. Also, while some of the subsequent stages of the pipeline may have results which depend on whether the second stage shift has to be applied or not, these stages can be performed faster by speculatively calculating two candidate values, one assuming the second stage shift is applied and another assuming the second stage shift is not applied, and then selecting between the candidate values once it is known whether the second stage shift has to be applied. For example, this may be used when determining values used for rounding and/or tininess detection.

The pipeline uses a widened unconstrained exponent, where −Max exp<E<Max exp. The range of exponents is used to compensate for the normalization left shifting 34. For every position left shifted the exponent is decremented by one. We constrain the normalization left shift to stop left shifting once the exponent reaches one. This can be done by setting a '1' bit in a syndrome input to the LDA 68 which represents the position beyond which no further shifting should be carried out. Hence, regardless of whether the second stage shift is performed, if the exponent started above one, it will be constrained above one.

After the first stage of normalization, we start the conversion from two's complement. The inverting circuitry 35 inverts the number if the fraction is in negative two's complement form and adjusts the result sign for result 38 accordingly. The second stage of normalization described above is performed on the fraction in one's complement (the inverted output of the first stage shift)—hence the multiplexer described above for the second stage shift can be implemented after the inverting circuitry 35). Alternatively the multiplexer could be implemented before the inverting circuitry 35.

The final conversion from two's complement is done by the incrementing adder 36 which is alternately used for rounding by adding the rounding increment determined by rounding logic (which may include the rounding/conversion increment determining circuitry 30, 32 and primary/secondary tininess detection circuitry 42, 44 described earlier).

A trailing digit zero counter 72 is provided to detect if a given bit will be a trailing one after the inversion. The trailing digit count is used by comparator 73 to determine whether to perform the conversion increment (i.e. whether the addition at a subprecision point would carry out into the least significant bit). If the number of trailing digits of zero counted by trailing digit counter 72 is such that all bits below the rounding position are zero and the conversion increment is to be applied, then there is no need to add a rounding increment using incrementing circuitry 36—instead the added increment can be the conversion increment. The trailing digit count is also used to generate the S (sticky bit) term for rounding detection.

For the result rounding, the rounding increment is determined according to standard floating-point rounding rules such as those described above. Any known technique can be used by rounding logic to determine the rounding increment for the result rounding to generate result 38.

For the after-rounding tininess detection (underflow detection), to check whether after normalization and rounding the result has an exponent less than one, this can be implemented after the first stage of normalization.

The primary tininess detection circuitry 42 looks at the exponent, E, adjusted after the first stage of normalization performed by shift circuitry 34, and the top two bits of the fraction resulting from the first stage shift and the inversion 35 if an inversion is applied (hence this is based on the 1's complement of the shift output in the case when the inversion is required because two's complement result 67 was negative). Analysing the adjusted exponent E and top two fraction bits allows to identify one of the following 6 cases:

Case A: E<0: the exponent is negative, so the outcome is tiny. The MSB (most significant bit) of the exponent is used to indicate negativity.

Case B: E>1: the product is normal so the outcome is not tiny. This can be detected when any of the exponent bits are set while ignoring the exponent MSB and LSB (least significant bit).

Case C: E==1 and the fraction MSB is one: the result is either zero or normalized. The outcome is not tiny.

Case D: E==1 and the fraction 2nd MSB is one: possible tiny result. Use secondary detection scheme.

Case E: E==0 and fraction MSB is one: possible tiny result. Use secondary detection scheme.

Case F: E==0 and fraction MSB is zero: the outcome is tiny.

Hence, in cases A, B, C and F the primary tininess detection circuitry 42 determines that the outcome of the processing operation performed by processing circuitry 20 is outside a predetermined range in which addition of a rounding or conversion increment could change whether the outcome is tiny. Therefore, for cases A, B, C, F there is no need to use the secondary tininess detection circuitry 44. The multiplexer 46 shown in FIG. 2 selects the output of the primary tininess detection circuitry 42 in these cases.

For cases D and E, this means the result is such that if a rounding increment or conversion increment is added, this could cause a carry to propagate through the fraction causing a change from subnormal to a normal value, so tininess status depends on more careful analysis of the rounding/conversion increments and the lower bits of the fraction, which can be analysed by the secondary tininess detection circuitry 44.

Figure 4:
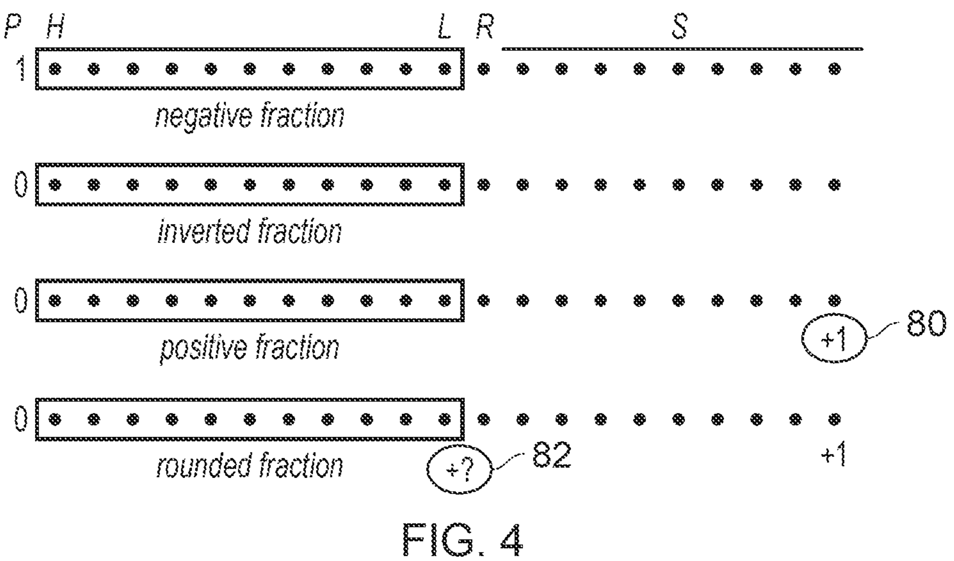
FIG. 4 illustrates a conversion increment and a rounding increment.

As shown in FIG. 4, the secondary tininess detection circuitry 44 considers that there may be two dependent increments applied when the fraction generated as the unnormalised is negative: the conversion increment 80 applied at the least significant bit for conversion from two's complement to sign-magnitude representation, and the rounding increment 82 applied at the least significant bit position not truncated to form the final rounded result. However, in practice the conversion increment 80 only affects the position at which the rounding increment 82 is applied if all lower bits are 1 following the inversion for the two's complement conversion, i.e. if all lower bits are 0 before the inversion, and in that case, no rounding would be needed as the lower bits following the conversion increment 80 would become all 0 again indicating an exact result that does not require rounding. Hence, in practice only one of the rounding increment 82 and conversion increment 80 actually needs to be considered for any one calculation.

Figure 5:
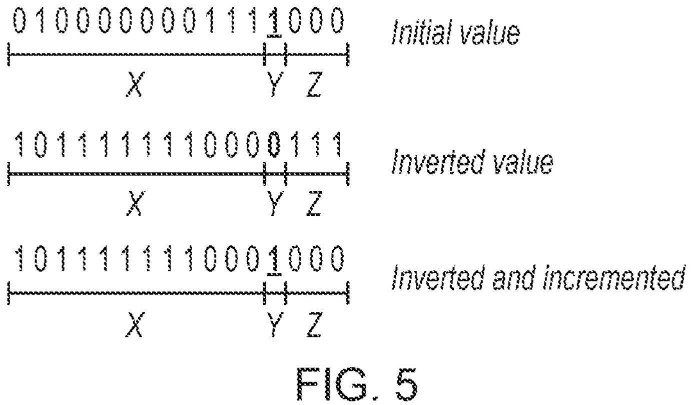
FIG. 5 illustrates two's complement conversion.

As shown in FIG. 5, some examples may not need to actually add a conversion increment 80 for the purpose of tininess detection, because inverting the initial value and adding the conversion increment causes trailing bits to remain unchanged during the conversion from two's complement. The value is broken into three groups, the leading digits X, the trailing one Y and the trailing zeros Z. It is observed that during the process of inversion and incrementing, X is inverted to become $\overline{X}$, but both Y and Z remain unchanged. Therefore, the trailing 1 and all lower bits of 0 remain the same. Therefore, the correct value of a bit following the two's complement conversion can be found by inverting it if converting and only if there are lower bits set in the initial value. The trailing digit count 72 mentioned earlier can therefore be used to detect whether the rounding status bits L, R, S should change state based on the conversion increment.

Figure 6:
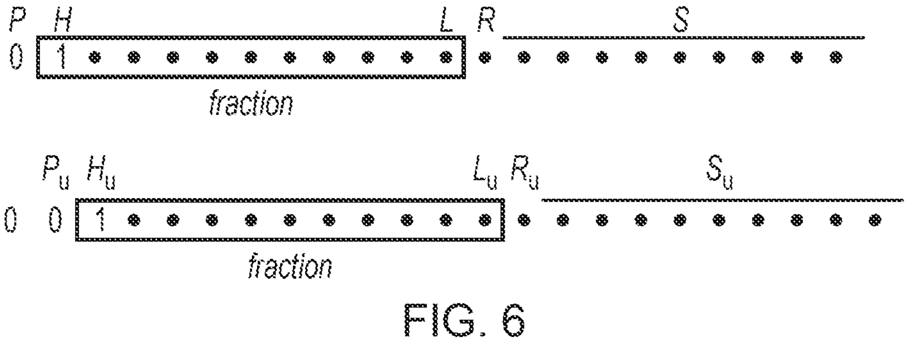
FIG. 6 illustrates rounding status values used for normalization and determining tininess status.

The secondary detection scheme applied by secondary tininess detection circuitry 44 includes:

1: The secondary detection scheme performs a one-bit left shift based on the MSB of the fraction (in 1's complement form output by inverter 35 if an inversion is applied). When the fraction MSB is zero, we left shift. When the fraction MSB is one we pass through without doing the further left shift. This is like the second stage of the of the constrained normalization. However, in this case, the fraction is aligned to exponent 0 rather than exponent 1. This accounts for the fact that tininess detection should be based on an unconstrained exponent, so the fraction bits to consider for after-rounding tininess detection are those starting from the leading 1 (rather than, in the case of the result rounding, those based on a constrained shift constrained to stop shifting at a shift amount corresponding to the minimum normal exponent). However, rather than actually performing such a left shift, if the unconstrained left shift is required for the secondary detection scheme, it is simpler to select the rounding status flags from one bit to the right of those used for the rounding of the result 38. This is shown in FIG. 6, where the top part shows the alignment of the result with exponent 1 for the constrained normalization (as performed based on the two stage shifting by shifter 34). In this case the rounding status flags used by circuitry 30 to determine the rounding increment are the least significant bit L, the guard bit R (also referred to as G above) and the sticky flag S based on an OR of the bits lower than R. The lower part of FIG. 6 shows the rounding status flags used to determine a tininess detection rounding increment for after-rounding tininess detection when the unconstrained left shift would be performed—rather than actually doing the left shift, the rounding status flags $L_u$, $R_u$, $S_u$ are selected from bit positions one place to the right of those used by circuitry 30 for selecting the result rounding increment for rounding the final result 38. If the extra one-bit left shift is not required then $L_u$, $R_u$, $S_u$ are the same as L, R, S used for the result rounding.

2: We are looking to detect if rounding will cause the result to change from subnormal to normal. This happens when rounding causes a carry-out. A carry-out can be detected if all the fraction bits are one and the rounding scheme increments the result. We perform an AND reduction on the aligned fraction from (1). The AND scheme requires a AND fraction width bit reduction. Although the AND reduction needs to consider whether the one-bit left shift described in point 1 is applied, which on the face of it requires a fraction-width multiplexer, in practice for a fraction with bits abc . . . def, the choice is essentially between ANDing bits abc . . . de and ANDing bits bc . . . def—both of these require an AND of the central bits bc . . . de and then a one bit 2:1 multiplexer can select whether the additional bit to be ANDed with the result of ANDing the central bits bc . . . de is bit a or bit f. Hence, the cost of what seems to require a fraction-width multiplexer can actually be reduced from the fraction width to a one bit 2:1 multiplexer, as the ordering of bits is not required to be considered in the AND reduction. The multiplexer selects which outer bit (e.g. a or f) is used depending on the MSB of the fraction which controls whether the shift is needed in point 1. This approach can greatly reduce the circuit area complexity.

3. Our normalized fraction is in one's complement form. We may have inverted it for the start of converting from a negative two's complement form to a signed number. It is observed that when converting from two's complement, trailing zeros are inverted, the trailing one remains unchanged, and all other bits are inverted (see FIG. 5 discussed above). The AND reduction from (2) can use the inverted fraction bits and a corrected LSB (see correction of $R_2$ in the worked examples described below). The corrected LSB is already available from the existing rounding scheme. This avoid the need to perform an full increment addition to verify the rounding.

4. It is noted that some rounding schemes factor the LSB when deciding if rounding should increment the value. Here, the LSB should be set for carry-propagation to occur. The rounding logic can be appropriately simplified.

The output of this scheme is also qualified by zero sum detection and inexact detection, which can be implemented according to any known technique. If the result is determined to be zero, the value is not tiny. If the result is determined to be inexact (at least one non-zero bit gets truncated following the rounding), and the value is tiny, an underflow is indicated to occur.

In some examples, based on the selected rounding mode and the rounding status flags L, R, S (for result rounding) and $L_u$, $R_u$, $S_u$ (for tininess detection rounding), and also considering the sign of the result to consider the conversion increment, the rounding increment and after-rounding tininess status can be determined according to the following rules (Where F represents the fraction width AND reduction)

| Rounding mode | Rounding increment for result rounding | Overflow function for secondary detection of after-rounding tininess status based on tininess detection rounding increment |
|---|---|---|
| NEGINF (round towards negative infinity) | sign & (R \| S) | sign & ($R_u$ \| $S_u$) & F |
| ODD (round to nearest odd) | 0 - no increment required (instead rounding sets L if R\|S) | 0 - as no increment, no possibility of overflow |
| POSINF (round towards + infinity) | !sign & (R\|S) | !sign & ($R_u$ \| $S_u$) & F |
| TIEEVEN (round ties to nearest even) | R&(S\|L) | $R_u$&F |
| ZERO (round towards zero) | 0-no increment required, just truncate | 0-as no rounding increment, no possibility of overflow |

Here, if the overflow function result is 1, this means an overflow occurs due to rounding causing a change from a tiny result 0.1111 . . . *2^Emin to a non-tiny exact result 1.0000 . . . *2^Emin. Hence, the result is tiny if the overflow function indicates 1.

Separately, if the overflow function for rounding indicates 0, but a conversion increment is being applied and the full fraction width AND reduction F is 1, then again an overflow occurs the result is not tiny.

Otherwise, if the result is in the predetermined range considered by the secondary detection scheme, and neither the overflow function for rounding nor the overflow due to the conversion increment occurs, then the result remains tiny.

Figures 7, 8:
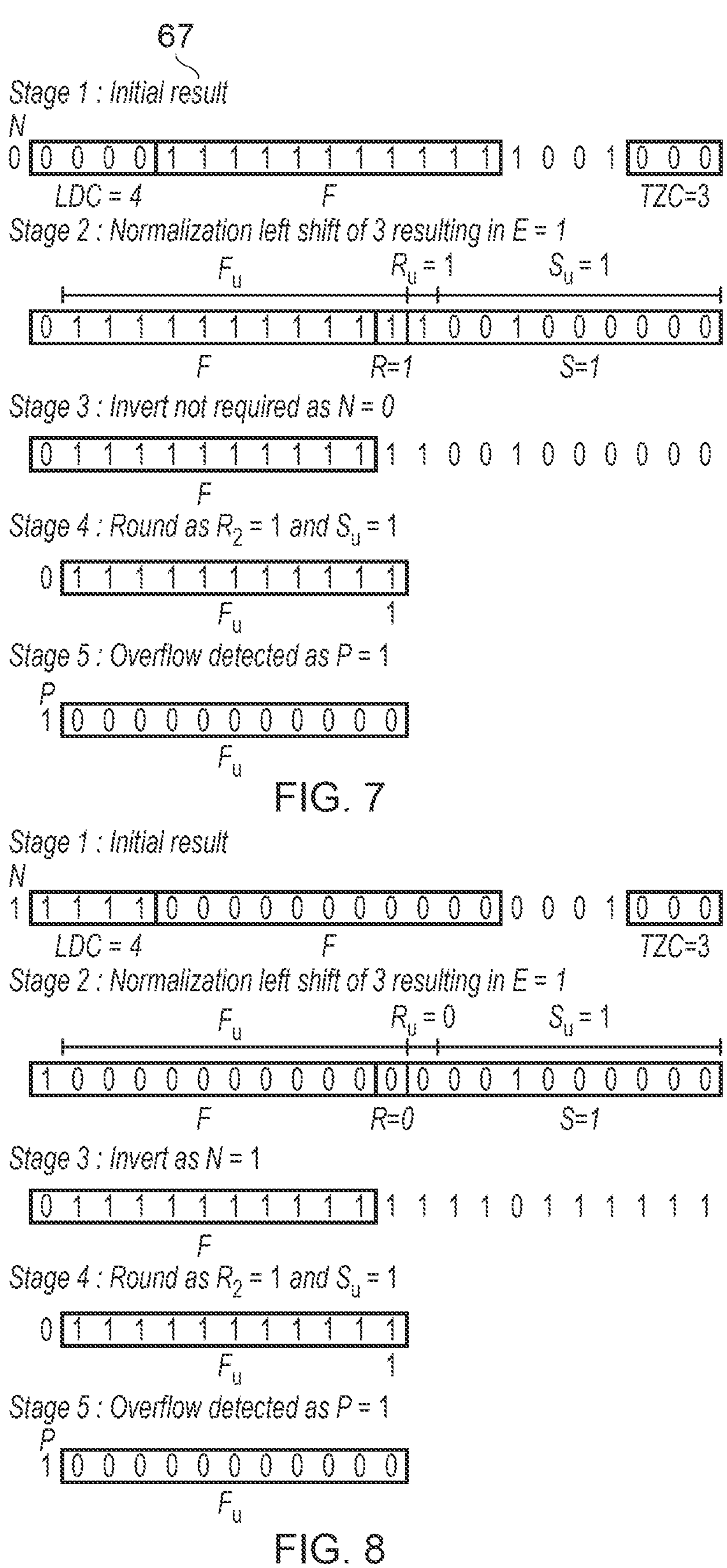
FIG. 7 illustrates a worked example of normalization and tininess detection for a positive result.
FIG. 8 illustrates a worked example of normalization and tininess detection for a negative two's complement result.

FIG. 7 illustrates a worked example of performing unconstrained underflow detection on a positive value. An extra more significant bit, N, is used to detect if the intermediate result 67 is a negative value in two's complement form. In this case N=0 so the intermediate result does not need to be converted from two's complement. The intermediate result is left shifted a maximum of 3 (in this example) to preserve the exponent remaining greater than zero. In this case the normalized exponent is 1. However, the most significant bit, H, of the fraction, F, is zero after being normalized so the result is currently tiny before rounding. The unconstrained normalized fraction for tininess detection requires an additional left shift resulting in an unconstrained normalized exponent of 0, so the rounding status bits $L_u$, $R_u$, $S_u$ are taken from one place to the right of those used for the result rounding. The unconstrained fraction, $F_u$ (again, with the implicit further one bit shift) is rounded without being inverted The unconstrained sticky bit, $S_u$, is directly extracted from the normalized result. The unconstrained rounding bit, $R_u$, should account for a potential conversion. Here, $R_2=R_u \oplus G\ (N \wedge S_u)=1$ ($R_u=1$ and N=0). However, in this example as N=0 there is no need for modification because the result is positive. Using TIEEVEN, for example, the value is notionally incremented as $R_2=1$. Overflow from the rounding increment is detected in the carry-out bit, P. The exponent after rounding becomes 1 making the result no longer tiny.

FIG. 8 illustrates a worked example of performing unconstrained underflow detection on a negative value. An extra more significant bit, N, is used to detect if the intermediate result is a negative value in two's complement form. The intermediate result is left shifted a maximum of 3 (in this example) to preserve the exponent remaining greater than zero. The most significant bit of the fraction, F, is zero after inversion implying the normalized result is tiny before rounding. The unconstrained fraction has an exponent of 0. The unconstrained fraction, Fu, is rounded after inversion. The unconstrained sticky bit, $S_u$, is not modified by the conversion from two's complement and can be directly extracted from the normalized result. The unconstrained rounding bit, $R_u$, accounts for the conversion. Here, $R_2=R_u \oplus (N \wedge S_u)=1$. Using TIEEVEN, for example, the value is notionally incremented as $R_2=1$. Overflow from the rounding increment is detected in the carry-out bit, P. The exponent after rounding becomes 1 making the result no longer tiny.

Figure 9:
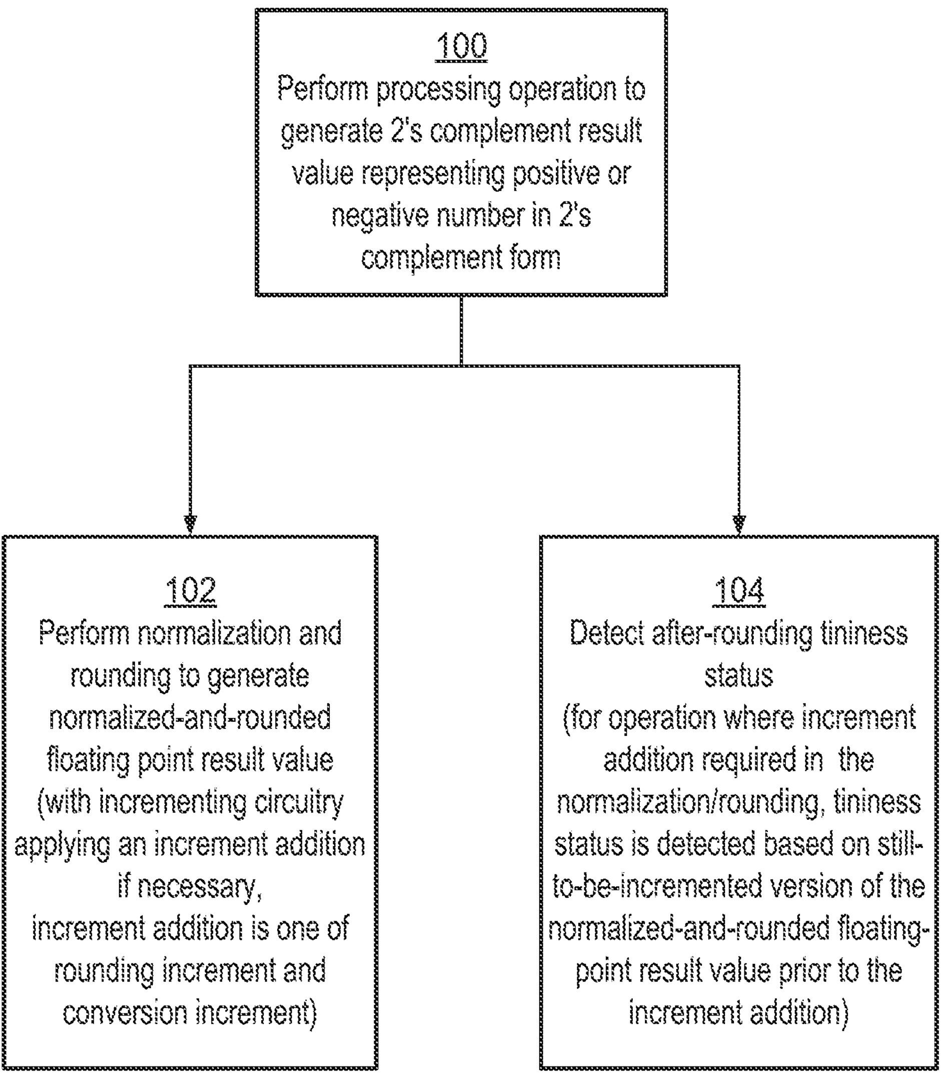
FIG. 9 is a flow diagram illustrating a method.

FIG. 9 is a flow chart showing a method performed by the apparatus described earlier. At step 100 the processing circuitry 20 performs a processing operation to generate a two's complement result value representing a positive or negative number in two's complement form.

At step 102, the normalization/rounding circuitry 22 performs normalization and rounding to generate a normalized-and-rounded floating point result value 38. The incrementing circuitry 36 of the normalization/rounding circuitry 22 performs an increment addition if necessary to generate the significand for the result 38, where the increment addition is one of a rounding increment calculated based on rounding flags for the required rounding mode and a conversion increment for converting a negative two's complement value to a sign-magnitude significand of the floating-point result. In some cases, the increment for two's complement conversion may not be explicitly required if it can instead be done as shown in FIG. 5 by only inverting the upper bits X above the trailing '1' bit. Meanwhile, at step 104 the tininess detection circuitry 24 detects after-rounding tininess status. For an operation where the increment addition is required in the normalization/rounding at step 102, the tininess status is detected based on a still-to-be-incremented version of the normalized-and-rounded floating-point result value prior to the increment addition being performed by the incrementing circuitry 36. For example, the tininess detection could be based on the value resulting from the shift circuitry 34 or the 1's complement value resulting from the inverting circuitry 35. By performing tininess detection on a value which could potentially be negative, before the final rounding/conversion increment is applied, the after-rounding tininess status can be detected faster.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further examples are set out in the following clauses:

1. An apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry.

2. The apparatus according to clause 1, in which, for an operation where the two's complement result value represents a negative number, the tininess detection circuitry is configured to detect the after-rounding tininess status based on a one's complement value obtained based on inverting bits of the two's complement result value.

3. The apparatus according to any of clauses 1 and 2, in which the tininess detection circuitry is configured to detect the after-rounding tininess status based on the still-to-be incremented version, without a further increment other than the result rounding increment or the conversion increment being performed on the still-to-be incremented version.

4. The apparatus according to any of clauses 1 to 3, in which a portion of the normalization-and-rounding circuitry is shared circuitry also used by the tininess detection circuitry to detect the after-rounding tininess status.

5. The apparatus according to clause 4, in which the shared circuitry comprises shift circuitry to perform a normalization shift, and the still-to-be-incremented version used by the tininess detection circuitry for detecting the after-rounding tininess status is dependent on a shifted result output by the shift circuitry.

6. The apparatus according to any of clauses 1 to 5, the normalization-and-rounding circuitry comprising shift circuitry to:

perform a first-stage normalization shift to shift the two's complement result value by a number of bit positions determined based on an exponent associated with the two's complement result value and a leading digit indication indicative of a number of leading digits having a predetermined value in the two's complement result value; and select whether to perform an operation equivalent to a second-stage normalization shift to left shift a result of the first-stage normalization shift by a further bit position, depending on whether a most significant bit of a result of the first-stage normalization shift is 0 or 1.

7. The apparatus according to clause 6, in which the tininess detection circuitry is configured to:

generate a first candidate value based on a first shifted value corresponding to a shifted result for which the second-stage normalization shift is not required;

generate a second candidate value based on a second shifted value corresponding to a shifted result taking into account the second-stage normalization shift; and select between the first candidate value and the second candidate value in response to information indicative of whether the second-stage normalization shift is required, wherein the after-rounding tininess status depends on which of the first candidate value and the second candidate value is selected.

8. The apparatus according to any of clauses 1 to 7, in which the tininess detection circuitry comprises:

primary tininess detection circuitry to detect, based on an adjusted exponent adjusted to account for a normalization shift performed by the normalization-and-rounding circuitry, whether an outcome of the processing operation is in a predetermined range for which the increment addition by the incrementing circuitry is capable of changing whether the outcome is tiny; and secondary tininess detection circuitry to determine, in a case when the primary tininess detection circuitry detects that the outcome is in the predetermined range, whether the outcome is tiny based on analysis of bits of the still-to-be-incremented version of the normalized-and-rounded floating-point result value.

9. The apparatus according to clause 8, in which when the primary tininess detection circuitry detects that the outcome is outside the predetermined range, the tininess detection circuitry is configured to detect the after-rounding tininess status independent of an output of the secondary tininess detection circuitry.

10. The apparatus according to any of clauses 8 and 9, in which:

for rounding the fraction of the normalized-and-rounded floating-point result value, the normalization-and-rounding circuitry is configured to determine the result rounding increment according to a given rounding mode, and when the result rounding increment is required, to apply the result rounding increment at a given bit position corresponding to a least significant bit position to be retained after rounding the normalized-and-rounded floating-point result value; and the secondary tininess detection circuitry is configured to determine whether rounding of the fraction of the floating-point result value at another bit position to the right of the given bit position would cause a change in whether the outcome is tiny.

11. The apparatus according to clause 10, in which the secondary tininess detection circuitry is configured to determine whether the rounding at the other bit position would cause the change in whether the outcome is tiny based on analysis of bits of the still-to-be-incremented version of the normalized-and-rounded floating-point result value, to avoid actually adding a further rounding increment at said other bit position.

12. The apparatus according to clause 10 or 11, in which the secondary tininess detection circuitry is configured to perform an AND reduction of bits of the still-to-be-incremented version of the normalized-and-rounded floating-point result value to determine whether an addition of a tininess-detection rounding increment at the other bit position or an addition of the conversion increment at a least significant bit position would cause a change in whether the outcome is tiny due to propagation of a chain of carries caused by the tininess-detection rounding increment.

13. The apparatus according to any of clauses 10, 11 and 12, in which the secondary tininess detection circuitry is configured to determine whether the rounding at the other bit position would cause the change in whether the outcome is tiny, based on a different selection of rounding status bits to a selection of rounding status bits used by the normalization-and-rounding circuitry for determining whether the result rounding increment is required for rounding the fraction of the floating-point result value.

14. The apparatus according to any of clauses 1 to 13, in which for any given instance of the processing operation performed by the processing circuitry, the incrementing circuitry is configured to perform only one of the result rounding increment and the conversion increment.

15. The apparatus according to any of clauses 1 to 14, in which the processing operation comprises a multiply-add operation to multiply a first operand by a second operand and add a product of the first operand and the second operand to a third operand.

16. A method comprising:

performing, using processing circuitry, a processing operation to generate a two's complement result value representing a positive or negative number in two's complement representation;

performing, using normalization-and-rounding circuitry, normalization-and-rounding to convert the two's complement result value to a normalized-and-rounded floating-point result value represented using sign-magnitude representation, the normalization-and-rounding circuitry comprising incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and detecting, using tininess detection circuitry, an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value; in which:

for an operation where the increment addition is required to be performed by the incrementing circuitry, the after-rounding tininess status is detected based on a still-to-be-incremented version of the normalized-and-rounded floating-point result value prior to the increment addition by the increment circuitry.

17. A non-transitory computer-readable medium to store computer-readable code for fabrication of an apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized/rounded floating-point result value; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry.

18. An apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation; and for any given instance of the processing operation performed by the processing circuitry, the incrementing circuitry is configured to perform only one of the result rounding increment and the conversion increment.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry configured to perform a processing operation to generate a two's complement result value representing a positive or negative number in two's complement representation;

normalization-and-rounding circuitry configured to convert the two's complement result value to a normalized-and-rounded floating-point result value represented using sign-magnitude representation; and tininess detection circuitry configured to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized-and-rounded floating-point result value; in which:

the normalization-and-rounding circuitry comprises incrementing circuitry configured to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation;

for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry; and for an operation where the two's complement result value represents a negative number, the tininess detection circuitry is configured to detect the after-rounding tininess status based on a one's complement value obtained based on inverting bits of the two's complement result value.

2. The apparatus according to claim 1, in which the tininess detection circuitry is configured to detect the after-rounding tininess status based on the still-to-be incremented version, without a further increment other than the result rounding increment or the conversion increment being performed on the still-to-be incremented version.

3. The apparatus according to claim 1, in which a portion of the normalization-and-rounding circuitry is shared circuitry also used by the tininess detection circuitry to detect the after-rounding tininess status.

4. The apparatus according to claim 3, in which the shared circuitry comprises shift circuitry configured to perform a normalization shift, and the still-to-be-incremented version used by the tininess detection circuitry for detecting the after-rounding tininess status is dependent on a shifted result output by the shift circuitry.

5. The apparatus according to claim 1, the normalization-and-rounding circuitry comprising shift circuitry configured to:

perform a first-stage normalization shift to shift the two's complement result value by a number of bit positions determined based on an exponent corresponding to the two's complement result value and a leading digit indication indicative of a number of leading digits having a predetermined value in the two's complement result value; and select whether to perform an operation equivalent to a second-stage normalization shift to left shift a result of the first-stage normalization shift by a further bit position, depending on whether a most significant bit of a result of the first-stage normalization shift is 0 or 1.

6. The apparatus according to claim 5, in which the tininess detection circuitry is configured to:

generate a first candidate value based on a first shifted value corresponding to a shifted result for which the second-stage normalization shift is not required;

generate a second candidate value based on a second shifted value corresponding to a shifted result taking into account the second-stage normalization shift; and select between the first candidate value and the second candidate value in response to information indicative of whether the second-stage normalization shift is required, wherein the after-rounding tininess status depends on which of the first candidate value and the second candidate value is selected.

7. The apparatus according to claim 1, in which the tininess detection circuitry comprises:

primary tininess detection circuitry configured to detect, based on an adjusted exponent adjusted to account for a normalization shift performed by the normalization-and-rounding circuitry, whether an outcome of the processing operation is in a predetermined range for which the increment addition by the incrementing circuitry is capable of changing whether the outcome is tiny; and secondary tininess detection circuitry configured to determine, in a case when the primary tininess detection circuitry detects that the outcome is in the predetermined range, whether the outcome is tiny based on analysis of bits of the still-to-be-incremented version of the normalized-and-rounded floating-point result value.

8. The apparatus according to claim 7, in which when the primary tininess detection circuitry detects that the outcome is outside the predetermined range, the tininess detection circuitry is configured to detect the after-rounding tininess status independent of an output of the secondary tininess detection circuitry.

9. The apparatus according to claim 7, in which:

for rounding the fraction of the normalized-and-rounded floating-point result value, the normalization-and-rounding circuitry is configured to determine the result rounding increment according to a given rounding mode, and when the result rounding increment is required, to apply the result rounding increment at a given bit position corresponding to a least significant bit position to be retained after rounding the normalized-and-rounded floating-point result value; and the secondary tininess detection circuitry is configured to determine whether rounding of the fraction of the floating-point result value at another bit position to the right of the given bit position would cause a change in whether the outcome is tiny.

10. The apparatus according to claim 9, in which the secondary tininess detection circuitry is configured to determine whether the rounding at the other bit position would cause the change in whether the outcome is tiny based on analysis of bits of the still-to-be-incremented version of the normalized-and-rounded floating-point result value, to avoid actually adding a further rounding increment at said other bit position.

11. The apparatus according to claim 9, in which the secondary tininess detection circuitry is configured to perform an AND reduction of bits of the still-to-be-incremented version of the normalized-and-rounded floating-point result value to determine whether an addition of a tininess-detection rounding increment at the other bit position or an addition of the conversion increment at a least significant bit position would cause a change in whether the outcome is tiny due to propagation of a chain of carries caused by the tininess-detection rounding increment.

12. The apparatus according to claim 9, in which the secondary tininess detection circuitry is configured to determine whether the rounding at the other bit position would cause the change in whether the outcome is tiny, based on a different selection of rounding status bits to a selection of rounding status bits used by the normalization-and-rounding circuitry for determining whether the result rounding increment is required for rounding the fraction of the floating-point result value.

13. The apparatus according to claim 1, in which for any given instance of the processing operation performed by the processing circuitry, the incrementing circuitry is configured to perform only one of the result rounding increment and the conversion increment.

14. The apparatus according to claim 1, in which the processing operation comprises a multiply-add operation to multiply a first operand by a second operand and add a product of the first operand and the second operand to a third operand.

15. A non-transitory computer-readable medium to store computer-readable code for fabrication of an apparatus comprising:

processing circuitry to perform a processing operation to generate a two's complement result value representing a positive or negative number in two's complement representation;

normalization-and-rounding circuitry to convert the two's complement result value to a normalized-and-rounded floating-point result value represented using sign-magnitude representation; and tininess detection circuitry to detect an after-rounding tininess status indicative of whether an outcome of the processing operation is tiny, where a tiny outcome corresponds to a non-zero number with a magnitude smaller than a minimum non-zero magnitude representable as a normal floating-point number in a floating-point format to be used for the normalized-and-rounded floating-point result value; in which:

the normalization-and-rounding circuitry comprises incrementing circuitry to perform an increment addition to generate a fraction of the normalized-and-rounded floating-point result value, the increment addition comprising one of a result rounding increment for rounding the fraction of the normalized-and-rounded floating-point result value, and a conversion increment for conversion from the two's complement representation to the sign-magnitude representation;

for an operation where the increment addition is required to be performed by the incrementing circuitry, the tininess detection circuitry is configured to detect the after-rounding tininess status based on a still-to-be-incremented version of the normalized-and-rounded floating-point result value prior to the increment addition by the increment circuitry; and for an operation where the two's complement result value represents a negative number, the tininess detection circuitry is configured to detect the after-rounding tininess status based on a one's complement value obtained based on inverting bits of the two's complement result value.

* * * * *